US011878491B2

(12) United States Patent
Rees et al.

(10) Patent No.: US 11,878,491 B2
(45) Date of Patent: Jan. 23, 2024

(54) TEXTURED FABRIC SURFACES SEALED WITH OVERLAID POLYMERIC LAYERS

(71) Applicant: ENGINEERED FLOORS LLC, Dalton, GA (US)

(72) Inventors: John Joseph Matthews Rees, Chattanooga, TN (US); Dimitri Zafiroglu, Centreville, DE (US); Anthony Daniell, Dalton, GA (US)

(73) Assignee: ENGINEERED FLOORS LLC, Dalton, GA (US)

( * ) Notice: Subject to any disclaimer, the term of this patent is extended or adjusted under 35 U.S.C. 154(b) by 566 days.

(21) Appl. No.: 16/924,855

(22) Filed: Jul. 9, 2020

(65) Prior Publication Data

US 2021/0008856 A1 Jan. 14, 2021

Related U.S. Application Data

(60) Provisional application No. 62/872,064, filed on Jul. 9, 2019.

(51) Int. Cl.
*B32B 27/12* (2006.01)
*B32B 5/26* (2006.01)
(Continued)

(52) U.S. Cl.
CPC ............... *B32B 27/12* (2013.01); *B32B 3/30* (2013.01); *B32B 5/024* (2013.01); *B32B 5/26* (2013.01); *B32B 7/12* (2013.01); *B32B 27/08* (2013.01); *D06N 7/001* (2013.01); *D06N 7/0005* (2013.01); *D06N 7/0007* (2013.01); *D06N 7/0044* (2013.01); *B32B 2250/03* (2013.01); *B32B 2250/20* (2013.01); *B32B 2255/26* (2013.01); *B32B 2307/4026* (2013.01);
(Continued)

(58) Field of Classification Search
CPC .... D06N 7/0005; D06N 7/0007; D06N 7/001; D06N 7/0044; D06N 2209/12; D06N 2209/128; B32B 5/26; B32B 27/12; B32B 3/30; B32B 27/08; B32B 7/12; B32B 2307/7265; B32B 2255/26; B32B 2307/4026; B32B 2250/03
See application file for complete search history.

(56) References Cited

U.S. PATENT DOCUMENTS 5,965,232 A 10/1999 Vinod
7,425,359 B2 9/2008 Zafiroglu
(Continued)

OTHER PUBLICATIONS

Search Report and Written Opinion in corresponding/related International Application No. PCT/US20/041388 dated Dec. 2, 2020.
(Continued)

*Primary Examiner* — Cheryl Juska
(74) *Attorney, Agent, or Firm* — PATENT PORTFOLIO BUILDERS PLLC (57) ABSTRACT

A textile fabric with a three-dimensional contour that blocks fluid penetration at the surface is created by attaching a solid liquid-blocking polymeric layer conforming to the contours of the surface to a fabric layer. The surface includes elevated areas, depressed areas, a plurality of surface fibers and gaps among the plurality the plurality of surface fibers. The liquid-blocking polymeric layer is forced to follow the contours of the surface fibers and gaps using vacuum, heat and forced air. The resulting textile fabric maintains a textile appearance.

23 Claims, 4 Drawing Sheets

(51) Int. Cl.
  *B32B 5/02*   (2006.01)
  *B32B 3/30*   (2006.01)
  *B32B 27/08*  (2006.01)
  *B32B 7/12*   (2006.01)
  *D06N 7/00*   (2006.01)

(52) U.S. Cl.
  CPC ... *B32B 2307/7265* (2013.01); *B32B 2471/04* (2013.01); *D06N 2209/12* (2013.01); *D06N 2209/128* (2013.01)

(56) References Cited

U.S. PATENT DOCUMENTS

| | | |
|---|---|---|
| 7,431,975 B2 | 10/2008 | Zafiroglu |
| 2004/0106345 A1 | 6/2004 | Zafiroglu |
| 2004/0106346 A1 | 6/2004 | Zafiroglu |
| 2009/0047465 A1 | 2/2009 | Zafiroglu |
| 2010/0071115 A1 | 3/2010 | Sadato |
| 2013/0280486 A1 | 10/2013 | Zafiroglu |
| 2019/0010658 A1 | 1/2019 | Rees et al. |

OTHER PUBLICATIONS

Office Action dated Jan. 25, 2023 in related/corresponding CA Application No. 3,141,364.

TEXTURED FABRIC SURFACES SEALED WITH OVERLAID POLYMERIC LAYERS

CROSS-REFERENCE TO RELATED APPLICATIONS

This Application claims benefit from U.S. Provisional Patent Application No. 62/872,064 filed Jul. 9, 2019, the entire contents of which are incorporated herein by reference.

TECHNICAL FIELD

Embodiments of the subject matter disclosed herein relate to textile sheets and floor coverings.

BACKGROUND

Textile flooring and other textile surface-coverings, for example, wallcoverings and upholstery, at a minimum require surface stability and abrasion resistance. The required surface stability and abrasion resistance are needed without excessive hardening of the surface and with the preservation of at least some "textile feel" or textile look. Textile flooring and textile surface-coverings often have textured three-dimensional surfaces, including highly textured or deeply embossed surfaces, and the structure of the textured three-dimensional surfaces needs to be maintained under severe end use conditions associated, for example, with flooring and upholstery.

While three-dimensionally formed fabrics and flat fabrics with three-dimensional textured surfaces may be abrasion-resistant, the projecting fibers and the upper parts of the yarns at the cut edges of these fabrics are typically not anchored sufficiently close to the exposed tips at the cut edges. These insufficiently anchored yarn ends tend to fray or "fuzz". When used as a surface covering such as a floorcovering or wall covering, individual fabric tiles are grouped together, forming seams where adjacent cut edges meet. The grouped fabric tiles containing the insufficiently anchored yarns can develop visible lines of deterioration over time along the seams, even under conditions of normal use.

In addition to having a three-dimensional surface texture and a textile appearance that prevent fraying and fuzzing at the cut edges, some surface coverings also need to block liquids from spills or cleaning fluids penetrating the surface, even when the spill or cleaning fluid is pressed into the surface, for example, by the weight of traffic passing over the surface. Previous attempts at preventing liquids spilled on a fabric or a surface covering from breaching the upper or exposed surface used solid and relatively flat face structures that lack a textile look. These previous attempts utilized rubber, vinyl or other solid coatings and are exemplified by products such as Luxury Vinyl Tiles (LVT).

Surface coverings preserved a textile look on the surface while preventing the penetration of liquid through the surface covering using films or membranes attached to the bottom of the surface covering. However, films or membranes located on the bottom allowed liquids to penetrate into the surface covering from the top surface. This liquid penetration would continue into the lower layers of the surface covering until the liquid contacted the film or membrane at the bottom of the surface covering. Liquid penetration into the lower layers of the surface covering promotes the formation and growth of bacteria and fungi within the lower layers.

Attempts at using a film or membrane placed underneath the surface of a textile floorcovering to resist the penetration of spills are described, for example, in U.S. Pat. No. 5,965,232 to Vinod, U.S. Pat. No. 7,425,359 to Zafiroglu and U.S. Pat. No. 7,431,975 to Zafiroglu. These previous attempts placed the membrane between a relatively thin textile fabric surface layer and a cushioning backing to form a preferably breathable floorcovering that allows water vapors to escape but that resists the penetration of liquids from spills. The membrane or film was attached to the surface layer and backing with adhesive layers. U.S. Patent Application Publication No. 2013/0280486 to Zafiroglu discloses a liquid-blocking composite having a fibrous surface layer and a membrane placed directly under the surface layer. The surface layer may optionally have a texture deeper than the original thickness of the fibrous surface layer.

In all of these previous arrangements, spilled liquids are free to penetrate the surface layer, especially in flooring applications where foot traffic effectively applies additional pressure on spills that creates local hydrostatic pressure over 5 psi and occasionally higher. A localized pressure up to atmospheric pressure or around 15 psi may be generated by the application of traffic pressure above a puddle over a highly textured surface as liquid is trapped between the pressurizing surface such as a sole or heel of a shoe and the surface contours of a textured floorcovering. Furthermore, the surface fabrics remain vulnerable to surface deformation and the loss of texture with heavy use.

Therefore, a need exists for highly-textured products, such as surface covering products, and in particular floor coverings, that maintain high resistance to abrasion and surface deformation and that either completely block the flow of liquid from entering into the floorcovering or that block most the flow while maintaining a textile appearance and textile texture on the surface of the products. In addition, a need exists for a reliable and flexible method to make these highly textured products with special face aesthetics or special properties such as variations of color, microbial resistance, fire resistance, soiling resistance, and friction control.

SUMMARY

Exemplary embodiments are directed to systems and methods for making improved textile fabrics and composites containing the improved textile fabrics, e.g., floor coverings, by attaching to the textile fabric a thin polymeric layer that conforms into the highly textured surface. In one embodiment, the thin polymeric layer is a liquid blocking layer. The thin polymeric layer conforms to the three-dimensional contours of the surface of the textile fabric in at least partial detail and shows the profile of surface fibers or yarns. Therefore, the textured profile of the surface of the textile fabric is preserved, and the textile appearance and aesthetic of the textile fabric is maintained. In one embodiment, at least a portion of the yarn or fiber contour on the surface of the textile fabric is preserved. In one embodiment, the thin polymeric layer is forced partially into the spaces among the filaments or fibers exposed on the top surface of the textile fabric. In one embodiment, the thin polymeric layer is attached to the textile fabric using adhesive disposed within the thin polymeric layer. In one embodiment, the thin polymeric layer is attached to the three-dimensional surface of the textile fabric with a separate adhesive sublayer.

In one embodiment, the textile fabric is free-standing. In one embodiment, the textile fabric is attached to a backing layer disposed underneath or below the textile fabric. Suitable backings or backing layers include, but are not limited to, bulky and porous cushioning backings. In one embodiment, the textile fabric is a porous fabric having a textured surface, and the backing layer is a solid backing placed under the porous textile fabric. The textile fabric has a resistance to liquid penetration, i.e., a hydrostatic resistance, at the surface of at least 5 psi, preferably at least 10 psi, more preferably at least 15 psi.

Exemplary embodiments are also directed to a method for forcing a heated polymeric thermoplastic liquid-blocking surface layer into depressed areas or open areas of a textured textile fabric. In one embodiment, the liquid-blocking surface layer is drawn into the depressed areas, open areas or surface gaps between yarns or fibers using vacuum. Vacuum is applied to a face of the textile fabric opposite the liquid-blocking surface layer. In one embodiment, vacuum is applied directly to a porous textile fabric. In one embodiment, vacuum is applied to a porous backing attached to the porous textile fabric. In one embodiment, forced air is directed onto the liquid-blocking surface layer to push the liquid-blocking surface layer into the textured surface of the textile fabric. In one embodiment, the forced air is heated. Alternatively, the forced air is at ambient temperatures, and the surface is pre-heated. In one embodiment, forced air is used in combination with vacuum, either simultaneously or sequentially.

Exemplary embodiments are directed to a textile fabric containing a fabric layer with a surface having a plurality of elevated areas and a plurality of depressed areas defining a three-dimensional contour across the surface and a liquid-blocking polymeric layer continuously attached to the surface and conforming to the fibrous surface contour including projecting fibers or yarns or loops of fibers or yarns. The surface with the attached liquid-blocking polymeric layer has a hydrostatic resistance of at least 5 psi. In one embodiment, the hydrostatic resistance is at least 10 psi. In one embodiment, the hydrostatic resistance is at least 15 psi.

In one embodiment, the textile fabric includes a separate adhesive sublayer disposed between the surface and the liquid-blocking polymeric layer. In one embodiment, the adhesive sublayer is a film with an adhesive sublayer melting temperature. The fabric layer has a fabric layer melting temperature, and the liquid-blocking polymer layer comprising a liquid-blocking polymer layer melting temperature. The adhesive layer melting temperature is less than the fabric layer melting temperature and the liquid-blocking polymer layer melting temperature. In one embodiment, the adhesive sublayer is a low-melting polymeric layer attached to one of the fabric layer and the liquid-blocking polymer layer before attaching the liquid-blocking polymer layer to the surface of the fabric layer. In one embodiment, the adhesive sublayer is attached by coating or extruding.

In one embodiment, the adhesive sublayer contains low-melting granules. The low-melting granules are deposited onto one of the surface of the fabric and the liquid-blocking polymer layer before attaching the liquid-blocking polymer layer to the surface of the fabric layer. Suitable low-melting granules include, but are not limited to, particles and powders. In one embodiment, the surface of the fabric has a texture formed with loops of woven, knit, stitched, or tufted yarns. In one embodiment, the fabric is a nonwoven layer containing filaments or staple fibers, and the contour is a three-dimensional pattern embossed in the nonwoven layer. In one embodiment, the nonwoven layer is a needle-punched felt, and the surface has a texture formed with regular needles or cup needles. In one embodiment, the fabric is a bonded or hydro-entangled nonwoven web, and the face contours are defined by the entangled or bonded fibers or filaments.

In one embodiment, the textile fabric includes a backing layer attached to a back of the fabric opposite the surface. In one embodiment, the texture or contour contains a plurality of spaces, and the liquid-blocking polymer layer conforms to the spaces. In one embodiment, the plurality of spaces includes spaces between yarns, spaces between filaments or spaces between fibers. In one embodiment, the liquid-blocking polymer layer also includes functional components. In one embodiment, the functional components affect at least one of coloring, abrasion resistance, conductivity, and decorative properties in the textile fabric.

Exemplary embodiments are also directed to a method for forming a liquid-blocking textile fabric having a three-dimensionally textured surface. A fabric layer is formed with a surface having a plurality of elevated areas and a plurality of depressed areas defining a three-dimensional contour across the surface. A liquid-blocking polymeric layer is placed on the surface, and heat is applied to the liquid-blocking polymeric layer and vacuum to a back of the fabric layer opposite the surface to pull heated and softened liquid-blocking polymeric layer at least partially into the fabric layer. This attaches the liquid-blocking polymeric layer to the surface and conforms the liquid-blocking polymeric layer to the texture of three-dimensional contour. In one embodiment, the fabric layer is a porous fabric layer. In one embodiment, the fabric layer contains yarns, filaments or staples fibers.

In one embodiment, the liquid-blocking polymeric layer has a liquid-blocking polymeric layer melting temperature, and the fabric layer has a fabric layer melting temperature. The liquid-blocking polymeric layer melting temperature is less than the fabric layer melting temperature. In one embodiment, the liquid-blocking polymeric layer is a solid film. The liquid-blocking polymeric layer is heated above the liquid-blocking polymeric layer melting temperature before, during or after applying vacuum. In one embodiment, forced air is used to propel the liquid-blocking polymeric layer onto and into the surface. In one embodiment, heated forced air is used to propel the liquid-blocking polymeric layer onto and into the surface. In one embodiment, heat is applied by radiating heat onto the liquid-blocking polymeric layer prior to the application of one or more of vacuum, forced heated air and forced unheated air.

In one embodiment, a separate adhesive sublayer is placed between the surface and the liquid-blocking polymeric layer, and heat and vacuum are applied to pull the heated and softened liquid-blocking polymeric layer and adhesive sublayer at least partially into the fabric layer, to attach the liquid-blocking polymeric layer and adhesive sublayer to the surface and to conform the liquid-blocking polymeric layer and adhesive sublayer to the contour. In one embodiment, the adhesive sublayer is a film, fabric, molten and extruded polymer, a polymer coated onto the fabric surface, or a layer of low-melting polymeric particles or powders. In one embodiment, the liquid-blocking adhesive layer includes at least one of high-melting granules and non-melting granules that enhance at least one of aesthetics and properties of the surface. In one embodiment, the granules are powders or particles. In one embodiment, granules are selected to produce color or to create visual effects on the surface. In one embodiment, granules are selected to impart functional properties in the textile fabric. Suitable functional properties include antimicrobial resistance, fire resistance, and friction resistance. In one embodiment, the liquid-blocking polymeric layer is a color-printed film. In one embodiment the decorative or functional granules are contained within the liquid blocking layer itself.

Exemplary embodiments are also directed to a method for forming a liquid-blocking textile fabric having a three-dimensionally textured surface. A fabric layer having surface and fibrous elements along the surface is selected. The fibrous elements have a fibrous element melting point. A liquid-blocking polymeric layer is placed onto the surface. The liquid-blocking polymeric layer has a liquid-blocking polymeric layer melting point, and the liquid-blocking polymeric melting point is lower than the fibrous element melting point. A three-dimensional contour containing a plurality of elevated areas and a plurality of depressed areas is embossed into the fabric layer and liquid-blocking polymeric layer. The liquid-blocking polymeric layer is attached continuously to the surface and conforms to the contour. The embossed fabric layer and liquid-blocking polymeric layer are heated, and at least one of forced air at the liquid-blocking polymeric layer and vacuum to a back of the fabric layer opposite the surface is used to force the liquid-blocking adhesive layer at least partially into the openings among fibrous elements on the surface.

In one embodiment, an adhesive sublayer is placed between the surface and the liquid-blocking polymeric layer. The adhesive sublayer has an adhesive sublayer melting point, and the adhesive sublayer melting point is lower than the liquid-blocking polymeric layer melting point. In one embodiment, the liquid-blocking adhesive layer is co-extruded with the adhesive sublayer. In one embodiment, the adhesive sublayer is an extruded polymer, a coated polymer, a sifted particle or a powder.

Exemplary embodiments are directed to a liquid-blocking textile fabric having a textile fabric layer with a fibrous surface having a surface contour containing a plurality of elevated areas and a plurality of depressed areas and a liquid-blocking polymeric layer attached to the fibrous surface and conforming continuously to the fibrous surface through the elevated areas and depressed areas to maintain the surface contour. In one embodiment, the fibrous surface with the attached liquid-blocking polymeric layer has a hydrostatic resistance of at least 5 psi, preferably at least 10 psi, more preferably at least 15 psi. In one embodiment, the liquid-blocking textile fabric includes a backing layer attached to a back of the textile fabric layer opposite the fibrous surface.

In one embodiment, the liquid-blocking textile fabric also includes a separate adhesive sublayer disposed between the fibrous surface and the liquid-blocking polymeric layer. The adhesive sublayer and liquid-blocking polymeric layer conform continuously to the fibrous surface through the elevated areas and depressed areas to maintain the surface contour. In one embodiment, the adhesive sublayer has an adhesive sublayer melting temperature, and the textile fabric layer has a fabric layer melting temperature. The liquid-blocking polymer layer has a liquid-blocking polymer layer melting temperature, and the adhesive layer melting temperature is less than the fabric layer melting temperature and the liquid-blocking polymer layer melting temperature.

In one embodiment, the adhesive sublayer is a low-melting polymeric layer attached to one of the surface of the textile fabric layer and the liquid-blocking polymer layer before attaching the liquid-blocking polymer layer to the surface of the fabric layer. In one embodiment, the adhesive sublayer is a coated adhesive sublayer or an extruded adhesive sublayer. In one embodiment, the adhesive sublayer contains low-melting granules deposited onto one of the fibrous surface and the liquid-blocking polymer layer before attaching the liquid-blocking polymer layer to the fibrous surface.

In one embodiment, the textile fabric layer is a nonwoven layer containing filaments or staple fibers, and the surface contour is an embossed three-dimensional surface contour. In one embodiment, the nonwoven layer is a needle-punched felt, and the fibrous surface has a surface texture formed with regular needles or cup needles.

In one embodiment, the fibrous surface also has a surface texture containing a plurality of gaps, and the liquid-blocking polymer layer conforms to the surface texture and extends into the gaps. In one embodiment, the surface texture is formed with loops of woven yarns, knit yarns, stitched yarns, or tufted yarns, and the gaps are gaps among the loops of woven yarns, knit yarns, stitched yarns, or tufted yarns. In one embodiment, the gaps are gaps among yarns, filaments or fibers in the fibrous surface.

In one embodiment, the liquid-blocking polymer layer includes functional components. Suitable functional components affect at least one of coloring, abrasion resistance, conductivity, surface friction, and decorative properties in the textile fabric layer.

Exemplary embodiments are also directed to a method for forming a liquid-blocking textile fabric. A surface contour is formed in a fibrous surface of a textile fabric layer. This surface contour includes a plurality of elevated areas and a plurality of depressed areas. A liquid-blocking polymeric layer is placed on the fibrous surface. Heat is applied to the liquid-blocking polymeric layer, and vacuum is applied to a back of the fabric layer opposite the fibrous surface to pull heated and softened liquid-blocking polymeric layer at least partially into the fabric layer, to attach the liquid-blocking polymeric layer to the surface and to conform the liquid-blocking polymeric layer continuously to the fibrous surface through the elevated areas and depressed areas to maintain the surface contour.

In one embodiment, the textile fabric layer is a porous textile fabric layer. In one embodiment, applying heat includes radiating heat onto the liquid-blocking polymeric layer. In one embodiment, a surface texture is formed in the fibrous surface with yarns, filaments or fibers and gaps among the yarns, filaments or fibers. Heat and vacuum are applied to pull heated and softened liquid-blocking polymeric layer into the gaps and to conform the liquid-blocking polymeric layer continuously to the surface texture.

In one embodiment, air is directed onto the liquid-blocking polymeric layer to conform the liquid-blocking polymeric layer continuously to the fibrous surface through the elevated areas and depressed areas to maintain the surface contour. In one embodiment, the directed air is heated directed air. In one embodiment, a separate adhesive sublayer is placed between the fibrous surface and the liquid-blocking polymeric layer, and heat and vacuum are applied to pull heated and softened liquid-blocking polymeric layer and adhesive sublayer at least partially into the textile fabric layer, to attach the liquid-blocking polymeric layer and adhesive sublayer to the fibrous surface and to conform the liquid-blocking polymeric layer and adhesive sublayer continuously to the fibrous surface through the elevated areas and depressed areas to maintain the surface contour. In one embodiment, the adhesive sublayer is a film, fabric, molten and extruded polymer, a polymer coated onto the fabric surface, or a layer of low-melting polymeric granules.

In one embodiment, the liquid-blocking polymer layer contains high-melting granules, non-melting granules or high-melting granules and non-melting granules that enhance at least one of aesthetics and physical properties of the fibrous surface. In one embodiment, high-melting or non-melting granules are selected to produce a desired color or to create visual effects in the fibrous surface. In one embodiment, high-melting or non-melting granules are selected to impart antimicrobial resistance, fire resistance, or friction resistance in the textile fabric layer. In one embodiment, the liquid-blocking polymeric layer is a color-printed film.

Exemplary embodiments are also directed to a method for forming a liquid-blocking textile fabric having a three-dimensionally textured surface. A textile fabric layer with a fibrous surface having a surface texture comprising fibrous elements and gaps among the fibrous elements is selected. The fibrous elements have a fibrous element melting point. A liquid-blocking polymeric layer is placed onto the fibrous surface. The liquid-blocking polymeric layer includes a liquid-blocking polymeric layer melting point. The liquid-blocking polymeric melting point is lower than the fibrous element melting point. A three-dimensional pattern with a plurality of raised areas and a plurality of lowered areas is embossed into the textile fabric layer and liquid-blocking polymeric layer. The liquid-blocking polymeric layer is attached to the fibrous surface and conforms continuously to the fibrous surface through the raised areas and lowered areas to maintain the three-dimensional contour. The embossed textile fabric layer and liquid-blocking polymeric layer are heated, and air directed at the liquid-blocking polymeric layer, vacuum applied to a back of the textile fabric layer opposite the fibrous surface or air directed at the liquid-blocking polymeric layer and vacuum applied to a back of the textile fabric layer are used to force the liquid-blocking adhesive layer at least partially into the gaps among fibrous elements on the fibrous surface to maintain the surface texture.

In one embodiment, an adhesive sublayer is placed between the fibrous surface and the liquid-blocking polymeric layer. The adhesive sublayer has an adhesive sublayer melting point, the adhesive sublayer melting point is lower than the liquid-blocking polymeric layer melting point. In one embodiment, the liquid-blocking polymer layer and the adhesive sublayer are co-extruded onto the fibrous surface. In one embodiment, the adhesive sublayer is an extruded polymer, a coated polymer, or a sifted granule. In one embodiment, a surface contour is formed in the fibrous surface. The surface contour includes a plurality of elevated areas and a plurality of depressed areas. The embossed and contoured textile fabric layer and liquid-blocking polymeric layer are heated, and air directed at the liquid-blocking polymeric layer, vacuum applied to a back of the textile fabric layer, or air directed at the liquid-blocking polymeric layer and vacuum applied to a back of the textile fabric layer are used to conform the liquid-blocking polymeric layer continuously to the fibrous surface through the elevated areas and depressed areas to maintain the surface contour.

DETAILED DESCRIPTION

Reference throughout the whole specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or characteristics may be combined in any suitable manner in one or more embodiments.

Exemplary embodiments are directed to a liquid-blocking textile fabric and to methods for making a liquid-blocking textile fabric where one or more liquid blocking layers are attached to the upper, exposed face or fibrous surface of a textile fabric layer to block liquids at the fibrous surface and to prevent the liquids from entering into the textile fabric layer. Suitable liquid-blocking layers include, but are not limited to, polymeric liquid blocking layers. In one embodiment, the fibrous surface of the textile fabric layer has a surface texture defined by the yarns, filaments and fibers forming the textile fabric layer and gaps among those yarns, filaments and fibers along the surface. In one embodiment, the surface texture is formed with regular needles or cup needles driven into and through the textile fabric layer.

In one embodiment the textile layer has a surface contour extending into the textile fabric layer. The surface contour includes a plurality of elevated areas and a plurality of depressed areas that extend across the fibrous surface. In one embodiment, the textile fabric layer includes the surface texture and the surface contour. The surface contour is a coarser or larger pattern than the surface texture, and multiple gaps among the yarns, filaments and fibers are disposed in each elevated area and depressed area. With the liquid blocking layers attached to the fibrous surface, any surface texture, surface contour and three-dimensional pattern in the textile fabric layer is maintained.

In one embodiment, the textile fabric layer has larger three-dimensional pattern that is a coarser and deeper pattern than the surface contour. The three-dimensional pattern includes a plurality of raised areas and a plurality of lowered area. When the textile-fabric layer includes the surface contour and the three-dimensional pattern, multiple depressed areas and elevated areas of the surface contour are located in each raised area and lowered area. The textile fabric layer can include the surface texture, the surface contour or the three-dimensional pattern, the surface texture and surface contour, the surface texture and the three-dimensional pattern, the surface contour and the three-dimensional pattern, or the surface texture, the surface contour and the three-dimensional pattern. In one embodiment, the surface contour is an embossed surface contour. In one embodiment, the three-dimensional pattern is an embossed pattern.

Suitable textile fabric layers include, but are not limited to, a woven textile fabric layer, a knit textile fabric layer, a stitch-bonded textile fabric layer, and a tufted textile fabric layer. In one embodiment, the textile fabric layer is a nonwoven layer containing filaments or staple fibers, for example a needle-punched felt. In one embodiment, the textile fabric layer is formed with loops of woven yarns, knit yarns, stitched yarns, or tufted yarns, and the fibrous surface includes the gaps among the loops of woven yarns, knit yarns, stitched yarns, or tufted yarns.

At least one liquid-blocking layer is attached to the fibrous surface of the textile fabric layer and conforms continuously to the fibrous surface into the gaps among the yarns, filaments and fibers, through the elevated areas and depressed areas and through the raised areas and depressed areas to maintain the surface texture, the surface contour and the three-dimensional pattern in the liquid-blocking textile fabric. In one embodiment, the liquid-blocking layer is a liquid-blocking polymer layer. Suitable liquid-blocking polymeric layers, include, but are not limited to, polyester, polyethylene, polyamides, polyvinyl alcohol (PVA), a copolymer of ethylene and methacrylic, which is commercially available under the tradename Surlyn ionomer from Dow Chemical Company of Midland, Michigan, thermoplastic polyurethane (TPU) and thermoplastic elastomer (TPE). The thickness of each liquid-blocking polymeric layer is preferably in the range of from about 0.0005 inches to about 0.005 inches.

In one embodiment, the overlaid liquid-blocking polymeric layer is pre-printed with colored patterns for aesthetic purposes. In one embodiment the liquid-blocking polymeric layer contains non-melting or high-melting particles of colored pigments, fire resistant powders, antimicrobial powders, hard particles to increase resistance to abrasion, and particles reacting to moisture or heat to produce special visual or functional effects.

In one embodiment, the liquid-blocking polymer layer contains functional components, for example, that affect at least one of coloring, abrasion resistance, conductivity, surface friction, and decorative properties in the textile fabric layer. In one embodiment, the liquid-blocking polymeric layer is a color-printed film. In one embodiment, the liquid-blocking polymer layer includes high-melting or non-melting granules to produce a desired color or to create visual effects in the fibrous surface. The high-melting or non-melting granules impart antimicrobial resistance, fire resistance, friction resistance or combinations thereof in the textile fabric layer. In one embodiment, the liquid-blocking polymer layer includes high-melting granules, non-melting granules or high-melting granules and non-melting granules that enhance at least one of aesthetics and physical properties of the fibrous surface.

The liquid-blocking textile fabric having the fibrous surface with the attached liquid-blocking polymeric layer has a hydrostatic resistance of at least 5 psi. In one embodiment, the liquid-blocking textile fabric has a hydrostatic resistance of at least 10 psi. In one embodiment, the liquid-blocking textile fabric has a hydrostatic resistance of at least 15 psi.

In one embodiment, the liquid-blocking textile fabric includes at least one separate adhesive sublayer disposed between the fibrous surface and the liquid-blocking polymeric layer. The adhesive sublayer and the liquid-blocking polymeric layer conform continuously to the fibrous surface into the gaps among the yarns, filaments and fibers, through the elevated areas and depressed areas and through the raised areas and depressed areas to maintain the surface texture, the surface contour and the three-dimensional pattern in the liquid-blocking textile fabric. Adhesive sublayers with very high melt indexes and low melt viscosity can be used. In one embodiment, the thickness any adhesive sublayer ranges up to about 0.010 inches. In one embodiment, the adhesive sublayer has an adhesive sublayer melting temperature that is less than the fabric layer melting temperature and the liquid-blocking polymer layer melting temperature. In one embodiment, the adhesive sublayer is a low-melting polymeric layer attached to one of the surface of the textile fabric layer and the liquid-blocking polymer layer before attaching the liquid-blocking polymer layer to the surface of the fabric layer. The adhesive sublayer can be attached as a coated adhesive sublayer or an extruded adhesive sublayer. In one embodiment, the adhesive sublayer is configured as low-melting granules that are deposited onto one of the fibrous surface and the liquid-blocking polymer layer before attaching the liquid-blocking polymer layer to the fibrous surface. Suitable adhesive sublayers include, but are not limited to, a film, fabric, molten and extruded polymer, a polymer coated onto the fabric surface, and a layer of low-melting polymeric granules.

In one embodiment, the liquid-blocking textile fabric includes a backing or a backing layer attached to a back of the textile fabric layer opposite the fibrous surface. Any suitable backing or backing layers known or available in the art can be used.

Figure 1:
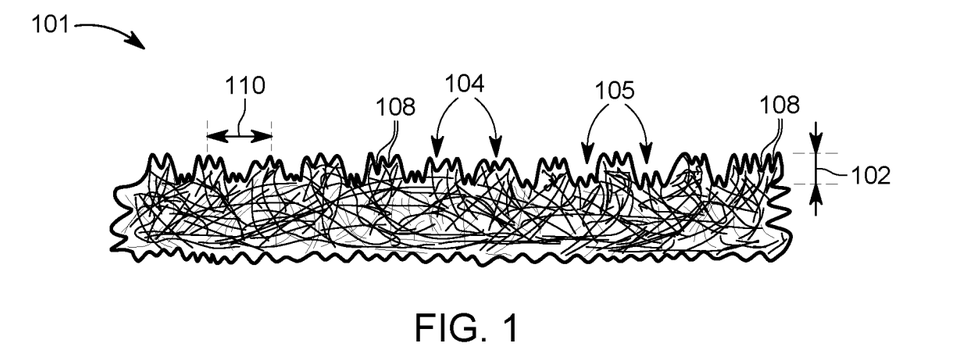
FIG. 1 is a schematic representation of an embodiment of a textile fabric layer with fibers, filaments, fiber groups or filament groups forming a surface texture and a surface contour.

Referring initially to FIG. 1, an embodiment of a textile fabric layer 101 having a surface texture and surface contour that is used in the liquid-blocking textile fabric is illustrated. The textile fabric layer 101 is generally flat and has a contoured surface containing elevated areas 104 and depressed areas 105. The elevated areas are spaced form one another by a center to center spacing distance 110. The depressed areas extend down into the textile fabric form the elevated areas by a typical depth 102. Suitable methods for forming the contour of elevated areas and depressed areas include embossing the surface with heat, point-bonding a flat fabric, differentially needle-punching fibrous webs with regular or cupped needles, and hydraulic needling fibrous webs over patterned substrates. The fibrous surface of the textile fabric layer also includes a surface texture defined by the yarns, staple fibers, filaments, groups of filaments or groups of fibers contained within the textile fabric layer and the depressions or gaps 108 among the yarns, fibers or filaments forming the textile fabric layer. Therefore, the textile fabric layer includes a surface texture and a surface contour. The surface texture extends through the elevated areas and depressed areas. In one embodiment, individual yarns, fibers or filaments, and the gaps among the yarns, fibers or filaments are visible mainly within the elevated areas and, to a lesser degree within the depressed areas of the surface contour.

Figure 2:
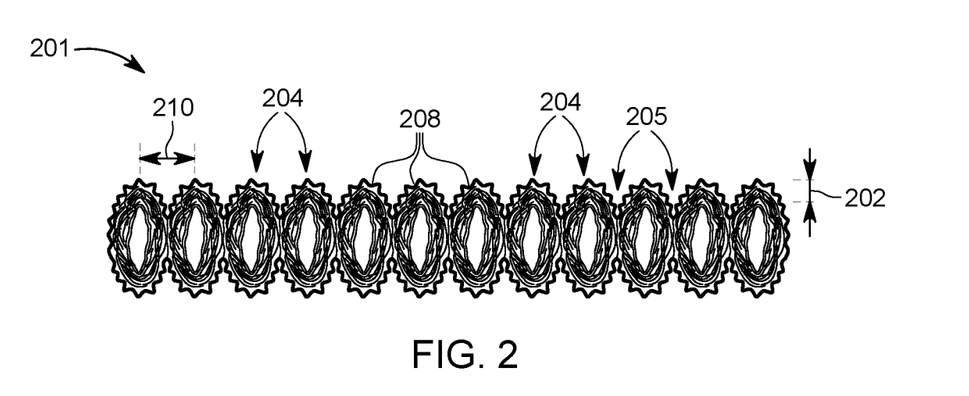
FIG. 2 is a schematic representation of an embodiment of a textile fabric layer having a fibrous surface formed with yarns going in and out of the surface to create loops, a surface texture and a surface contour.

Referring to FIG. 2, another embodiment of a textile fabric layer 201 having a surface texture and surface contour that is used in the liquid-blocking textile fabric is illustrated. The textile fabric includes a surface contour formed by yarns that loop in and out of the fibrous surface, creating elevated areas of yarn 204 spaced from each other by a center to center spacing distance 210 and depressed areas 205 between the yarn loops on the surface. The depressed areas extend into the textile fabric from the elevated areas by an average depth 202. The looping yarn surface is formed by knitting, tufting, weaving, stitch-bonding or shrinking overlapped and cross-bonded warps and wefts of yarns. The fibrous surface also includes a surface texture defined by the individual fibers or filaments in the yarns and the gaps 208 among the fibers or filaments. This surface texture extends through and is visible within the elevated and depressed areas of the surface contour.

Figure 3:
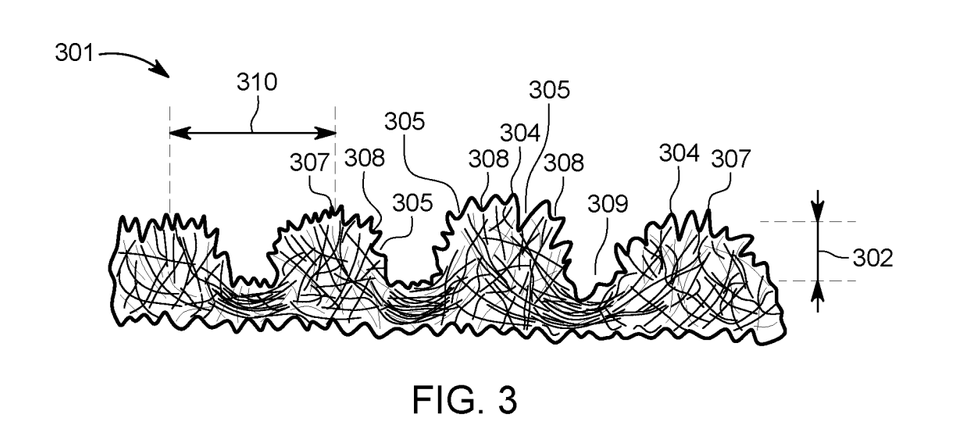
FIG. 3 is a schematic representation of an embodiment of a textile fabric layer having a surface texture and a surface contour combined with a coarser and deeper three-dimensional pattern embossed onto the textile fabric layer.

Referring to FIG. 3, another embodiment of a textile fabric layer 301 having a surface texture, a surface contour and a three-dimensional pattern that is used in the liquid-blocking textile fabric is illustrated. In this embodiment, the fibrous surface of a textile fabric layer has a surface texture and a surface contour, for example, as illustrated in FIGS. 1 and 2, in addition to a coarser and deeper three-dimensional pattern that is embossed into the textile fabric layer. Therefore, in addition to elevated areas 304 and depressed areas 305 of the surface contour and the gaps 308 among the yarns, filaments, and fibers of the surface texture, the coarser and deeper three-dimensional pattern creates a pattern of raised areas 307 and lowered areas 309. The raised areas are spaced apart at intervals 310, which is greater than the intervals between the elevated areas and the depressed areas. In addition, the lowered areas extend into the textile fabric layer to a general depth 302 that is larger and deeper than the depth of the depressed areas. Therefore, each raised area and each lowered area contains multiple elevated areas and multiple depressed areas of the surface contour. In one embodiment, the three-dimensional pattern extends into the textile fabric at depths 302 significantly greater than the depths 102 and 202 (FIGS. 1 and 2) of the depressed areas of fibers or yarns in the surface contour. In one embodiment, the raised areas and lowered area define a depth that is greater than the original thickness of the textile fabric layer. Individual fibers or filaments and the gaps 308 among the fibers or filaments are visible at the elevated and depressed areas and the raised areas and lowered areas.

Figure 4:
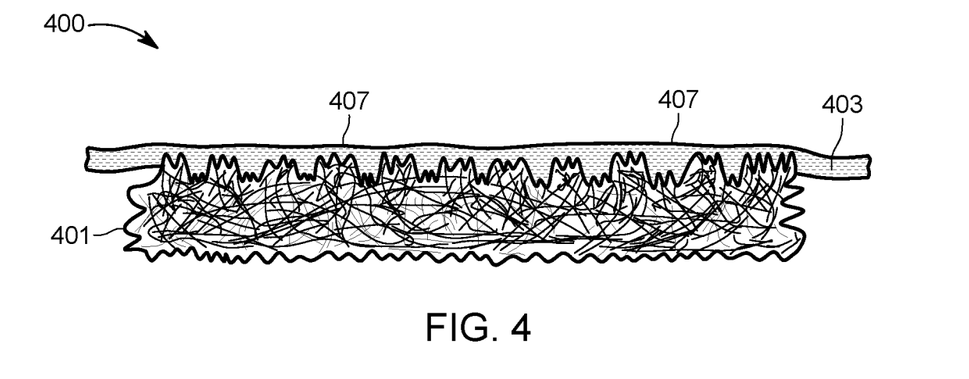
FIG. 4 is a schematic representation of an embodiment of a textile fabric layer as in FIG. 1 covered by a liquid-blocking layer and resulting in a highly flattened face.
Figure 5:
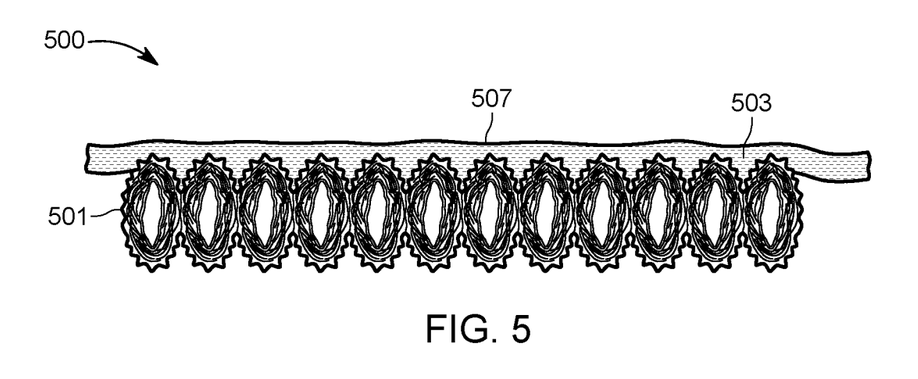
FIG. 5 is a schematic representation of an embodiment of a textile fabric layer as in FIG. 2 covered by a liquid-blocking layer that bridges across the tips of the loops and results in a relatively flat final surface.
Figure 6:
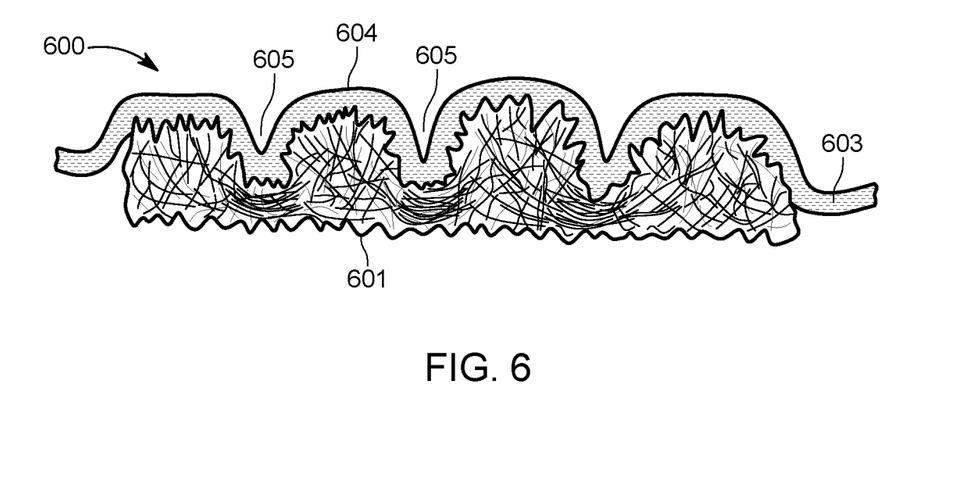
FIG. 6 is a schematic representation of an embodiment of a textile fabric layer as in FIG. 3 covered by a liquid-blocking layer that follows a general contour of the three-dimensional pattern but that fails to conform to the surface texture or the surface contour.

FIGS. 4-6 illustrate the placement of a liquid-blocking layer over the fibrous surface of the textile fabric layer containing arrangements of the surface texture, surface contour and three-dimensional pattern. Referring to FIG. 4, a textile fabric layer 401, for example, as in FIG. 1, having a surface texture and a surface contour with a thermoplastic polymeric liquid-blocking layer 403 placed on the fibrous surface is illustrated. The resulting composite 400 has final exposed top surface 407 that does not maintain the surface texture and surface contour. Similarly, referring to FIG. 5, a textile fabric layer 501, for example, as in FIG. 2, having a surface texture and a surface contour with a thermoplastic polymeric liquid-blocking layer 503 placed on the fibrous surface is illustrated. The resulting composite 500 has final exposed top surface 507 that does not maintain the surface texture and surface contour. The thermoplastic polymeric liquid-blocking layer was added to the textile fabrics using conventional methods such as laminating a film with pressure and heat using flat tooling or depositing a layer of hot melt polymer onto the fabric surface. The resulting final surfaces in FIGS. 4 and 5 are generally flattened, and the surface textures and surface contours of the original fibrous surfaces are lost as original depressed areas between the elevated fibers are eliminated and the gaps among yarns filaments or fibers are filled with the polymer. Therefore, the general textile look of these textile fabrics are lost.

Referring to FIG. 6, the composite textile fabric 600 containing the textile fabric layer 601 and liquid-blocking layer 603, for example, as illustrated in FIG. 4 or 5, is formed by embossing with a coarser and deeper three-dimensional pattern. The lowered areas 605 are densified and lose all original texture, while the raised areas 604 are less densified. The composite configuration of FIG. 6 can also be formed by simultaneously laminating the liquid-blocking layer to the textile fabric layer of, for example, FIG. 1 or 2 and embossing the coarser and deeper three-dimensional pattern.

Figure 7:
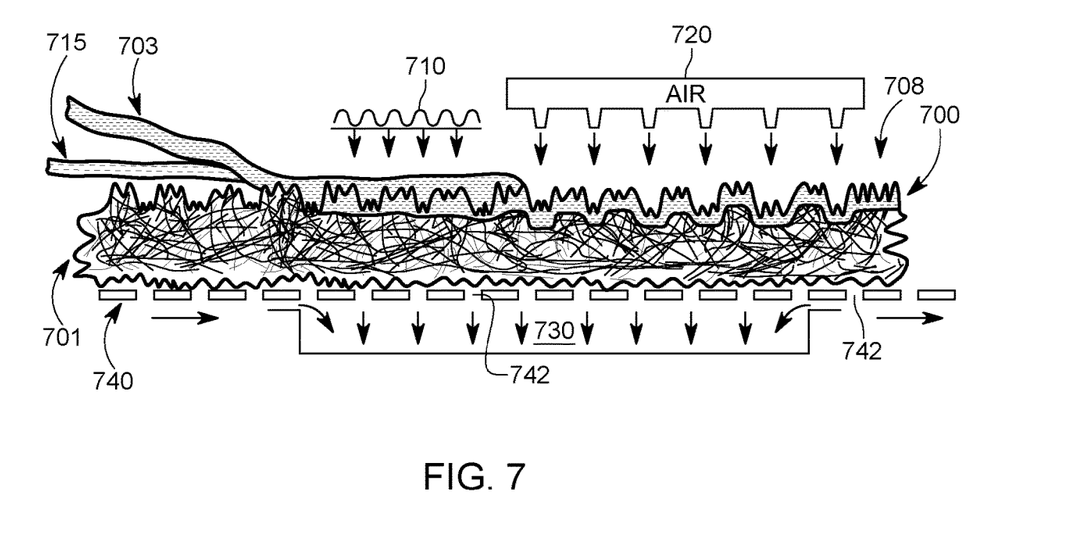
FIG. 7 is a schematic representation of an embodiment for forming a liquid-blocking textile fiber that maintains the surface texture and the surface contour.

Referring now to FIG. 7, an exemplary embodiment of forming a liquid-blocking textile fabric 700 is illustrated. A liquid-blocking thermoplastic polymeric layer 703 is placed or laid over the fibrous surface of a textile fabric layer 701. In one embodiment, the liquid-blocking polymeric layer is placed over the textile fabric layer in a continuous feed along a moving conveyor belt 740 or other conveying system. The textile fabric layer includes the surface texture and the surface contour containing elevated areas and depressed areas. The textile fabric layer and liquid-blocking polymeric layer is exposed to a source of heat 710, air 720, e.g., forced air, vacuum 730 or any combination of the three. Heat and air are directed onto the liquid-blocking thermoplastic layer, and vacuum is applied to the back of the textile fabric layer opposite the fibrous surface. In one embodiment, the moving conveying belt includes holes or passages 742 to facilitate application of vacuum to the back of the textile fabric layer.

In one embodiment, the liquid-blocking polymeric layer is pre-heated in situ, for example, using a source of radiant heat 710, heated or unheated forced air 720 or both radiant heat and heated or unheated forced air directed onto the liquid-blocking polymeric layer 703. This softens the liquid-blocking polymeric layer 703. In one embodiment, the liquid-blocking polymeric layer is sufficiently softened to allow vacuum 730 applied to a back of fabric layer opposite the fibrous surface to pull the molten liquid-blocking polymeric layer at least partially into the textile fabric layer. Therefore, the liquid-blocking polymeric layer conforms to the surface texture and surface contour continuously, i.e., across the entire area of the fibrous surface, including coarser and finer textures or larger contours of elevated areas and depressed areas on the surface. In one embodiment, the liquid-blocking polymeric layer enters the gaps 708 among the yarns, fibers and filaments, maintaining the shape of at least some the surface yarns, fibers or filaments. Therefore, the surface texture and the surface contour are maintained.

In one embodiment, the liquid-blocking polymeric layer 703 is first heated to a first temperature point where the liquid-blocking polymeric layer is sufficiently softened to conform over all surface textures and surface contours using vacuum 730, forced air 720 or both vacuum and forced air. The liquid-blocking polymeric layer is then reheated to a second higher temperature point and subjected to higher levels of vacuum, forced air or both vacuum and forced air to drive the liquid-blocking polymeric layer into the finer interstices among the yarns, fibers and filaments. In one embodiment, the liquid-blocking polymeric layer is an extruded polymeric layer or a roll-transferred polymeric layer. In one embodiment, the liquid-blocking polymeric layer is a thermoplastic film. In one embodiment the forced air is heated.

In one embodiment, at least one low melting adhesive sublayer 715 is introduced between the liquid-blocking polymeric layer and the fibrous surface of the textile fabric layer 701. Suitable methods for introducing the adhesive sublayer 715 include, but are not limited to, as a dry powder, a liquid suspension of a powder, a dissolved polymer, a scrim, a fabric, or a film. In one embodiment, the liquid-blocking polymeric layer 703 contains two layers, a low-melt film positioned underneath adjacent the fibrous surface and a high-melt film positioned above adjacent the liquid-blocking polymeric layer. In one embodiment, the low-melt and high-melt films are co-extruded prior to being introduced between the liquid-blocking polymeric layer and the fibrous surface. In one embodiment, the liquid-blocking polymeric layer and adhesive sublayer have different melt indexes. For example, a thicker inner film or adhesive sublayer with a high-melt index and low melt viscosity will flow into the gaps or interstices of the surface fabric while the outer liquid-blocking polymeric layer or higher-melting film can be very thin to allow it to conform into the finer surface openings or depressions of the fibrous surface while simultaneously providing high resistance to liquid flow.

In one embodiment, heat is applied to the liquid-blocking polymeric layer and adhesive sublayer prior to the introduction of vacuum to the back of the fabric layer. In one embodiment, activation of the liquid-blocking polymeric and adhesive sublayer is achieved by raising the temperature of the entire textile fabric to a level sufficient to melt the liquid-blocking polymeric layer and the adhesive sublayer without melting the fabric layer. The liquid-blocking polymeric layer and adhesive sublayer can be activated with heat before or during the application of at least one of vacuum or forced surface air.

In one embodiment, the adhesive sublayer 715 is a low melting woven or nonwoven fabric. In one embodiment, the adhesive sublayer 715 is in the form of low melt polymer deposited onto the fabric layer 701. In one embodiment, the adhesive sublayer 715 is in the form of low melting granules, e.g., particles or a powder, deposited onto the fibrous surface of fabric layer 701. In one embodiment, the deposited granules are a mixture of low melt and high melt components. In one embodiment, the deposited granules are obtained from grinding a used or rejected textile fabric or textile fabric composite.

In one embodiment, the textile fabric layer 701 is a porous and conformable textile fabric layer backed with an air-blocking backing. Therefore, vacuum can not be applied to the air-blocking backing. In one embodiment, the textile fabric layer with the attached liquid-blocking polymeric layer 703 is exposed to heat 710 and forced air 720 to melt the liquid-blocking polymeric layer 703 and to drive the molten liquid-blocking polymeric layer into the textile fabric layer. In one embodiment, the forced air is heated. The level of heating before or during the application of forced air to the surface is adjusted to avoid crushing the structure of the fibrous surface while providing adequate softening to the liquid-blocking layer.

Figure 8:
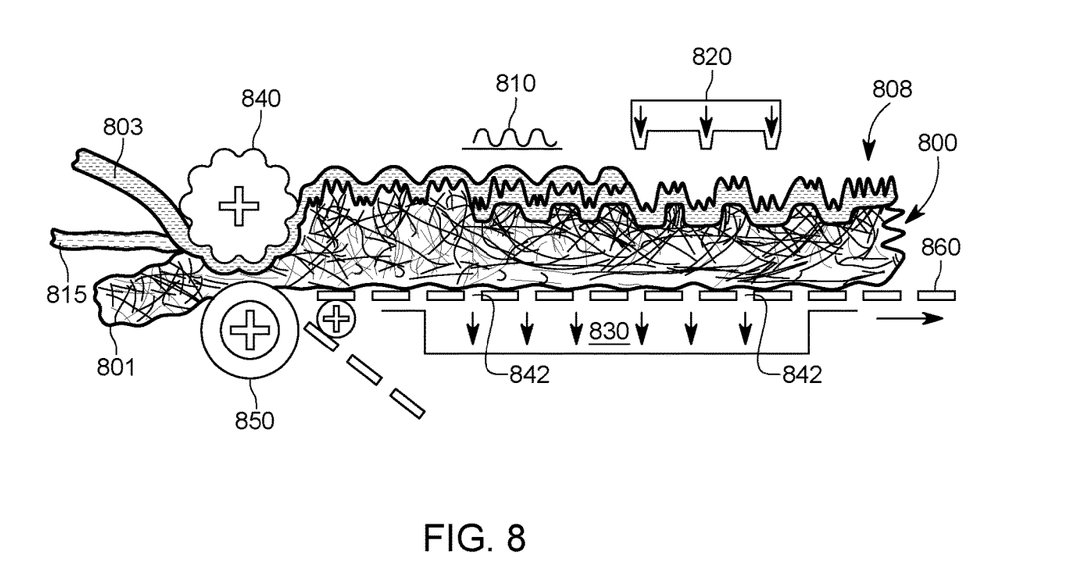
FIG. 8 is a schematic representation of an embodiment of forming a liquid-blocking textile fiber that maintains the surface texture, the surface contour and the three-dimensional pattern.

Referring to FIG. 8, an embodiment of forming a liquid-blocking textile fabric 800 having a surface texture, a surface contour and a three-dimensional pattern with a liquid-blocking layer attached to the fibrous surface while maintaining the surface texture, surface contour and three-dimensional pattern is illustrated. A fabric layer 801 having a surface texture and a surface contour with elevated areas and depressed areas is combined with a with a liquid-blocking polymeric layer 803, for example, in a continuous feed along a conveyor belt 860. The combined textile fabric layer and liquid-blocking polymeric layer passes between an embossing roll 840 and an opposing roll 850 to form a deeper and coarser three-dimensional pattern. In one embodiment, the three-dimensional pattern is embossed into the textile fabric layer and liquid-blocking polymeric layer while laminating the textile fabric layer to the liquid-blocking polymeric layer.

In one embodiment, a low melting adhesive sublayer 815 is positioned between the liquid-blocking polymeric layer 803 and the textile fabric layer. The resulting surface 808 of the laminated liquid-blocking textile fabric 860, while being initially smooth when combined with the textile fabric layer, recovers substantially the surface texture, the surface contour and the three-dimensional pattern continuously across the fibrous surface of the liquid-blocking textile fabric. One or more of radiant heat 810, and heated or unheated forced air 820 and vacuum 830 are applied to soften the liquid-blocking polymeric layer and to make the liquid-blocking polymeric layer conform to the surface texture, surface contour and three-dimensional pattern. In one embodiment, the conveyor belt 860 containing holes or passages 842 to facilitate application of the vacuum 830 is used to move the textile fabric through the various treatment processes. Conformity to the surface texture and surface contour renders the profile or shape of at least some individual fibers or filament visible on the final surface.

Figure 9:
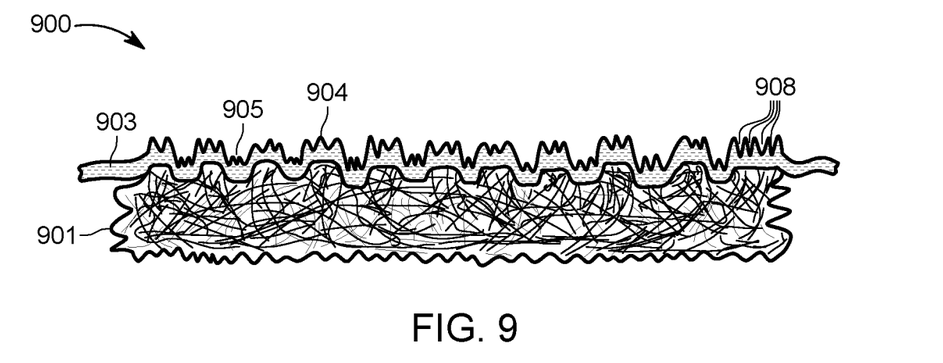
FIG. 9 is a schematic representation of an embodiment of a liquid-blocking textile fabric having an attached liquid blocking layer that maintains the surface contour and the surface texture.

Referring to FIG. 9, an exemplary embodiment of a liquid-blocking textile fabric 900 having a liquid-blocking polymer layer 903 that contacts the fibrous surface continuously and that maintains the surface texture and the surface contour through the elevated areas and depressed areas is illustrated. In one embodiment, the liquid-blocking textile fabric 900 includes a textile fabric layer 901, for example, the textile fabric layer 101 of FIG. 1, which is generally planar with a surface contour surface containing elevated areas 904, for example, formed from yarns, groups of filaments or groups of fibers, and depressed areas 905 between adjacent elevated areas. The textile fabric layer also includes a surface texture formed from the yarns, staple fibers, or filaments and the gaps among the yarns, fibers or filaments. In one embodiment, individual fibers or filaments 908 are visible through the liquid-blocking polymer layer within the elevated areas and also to a lesser extent in the depressed areas. Maintaining the surface depressions or gaps among the individual surface fibers and filaments preserves the surface texture and the textile surface look, in particular, in a flooring application with oblique light. The surface pressure created by the forced air from above or the vacuum underneath or both the forced air from above and the vacuum underneath forces and draws the liquid-blocking polymer layer into contact with the fibrous surface continuously and envelops the entire fibrous surface including the finer surface variations 908 formed by fibers, filaments or yarns and the elevated areas and depressed areas.

Figure 10:
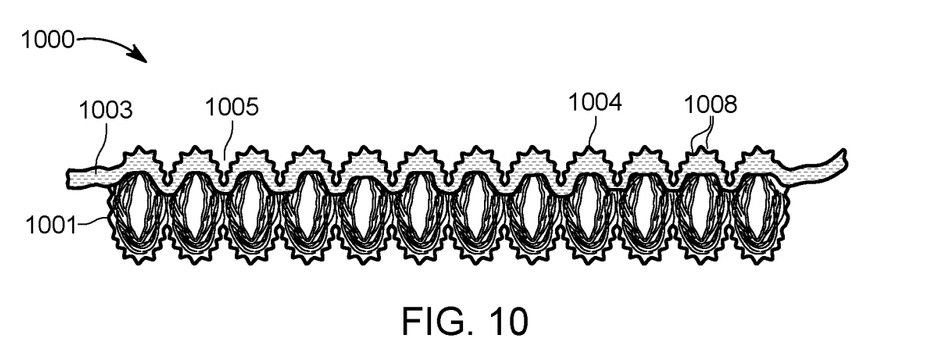
FIG. 10 is a schematic representation of an embodiment of a liquid-blocking textile fabric having a liquid-blocking layer attached on the fibrous surface of the textile fabric and following the contours of the surface yarn loops to maintain the surface texture and the surface contour.

Referring to FIG. 10, an exemplary embodiment of a liquid-blocking textile fabric 1000 having a liquid-blocking polymer layer 1003 that contacts the fibrous surface continuously and that maintains the surface texture and the surface contour through the elevated areas and depressed areas is illustrated. The liquid-blocking textile fabric includes a textile fabric layer 1001 having a surface texture and a surface contour formed by the yarns that loop in and out of the surface, creating elevated areas of yarn 1004 spaced from each other and depressed areas 1005 between the yarn loops on the surface. The depressed areas extend into the textile fabric. The looping yarn surface may be formed by knitting, tufting, weaving, stitch-bonding or shrinking overlapped and cross-bonded warps and wefts of yarns. The profile of individual fibers or filaments 1008 in the surface texture are visible within the elevated and depressed areas and includes depressions or gaps among the fibers or filaments. The surface pressure created by the forced air from above or the vacuum underneath or the forced air from above and the vacuum underneath forces and draws the liquid-blocking polymeric layer into contact with the fibrous surface continuously and envelops the whole surface including the finer surface variations 1008 formed by fibers, filaments or yarns.

Figure 11:
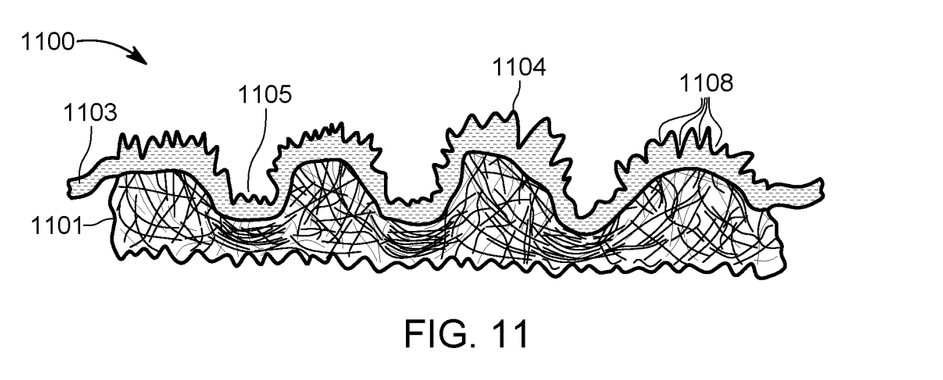
FIG. 11 is a schematic representation of an embodiment of a liquid-blocking textile fabric having a liquid blocking polymeric layer attached to the fibrous surface and maintaining the surface texture, the surface contour and the three-dimensional pattern.

Referring to FIG. 11, an exemplary embodiment of a liquid-blocking textile fabric 1100 having a textile fabric layer 1101 and a liquid-blocking polymer layer 1103 that contacts the fibrous surface continuously and that maintains the surface texture, the surface contour and the three-dimensional pattern through the elevated areas and depressed areas and raised areas and lowered areas is illustrated. In this embodiment, the liquid-blocking textile fabric includes the textile fabric layer, for example, the textile fabric layers illustrated in FIGS. 9 and 10, and is further contoured by embossing with a coarser and deeper three-dimensional pattern creating new raised areas 1104 and new lowered areas 1105 at intervals and to a general depth larger and deeper than the surface-spacings of the elevated areas and depressed areas of the surface contours shown in FIGS. 9 and 10. In one embodiment, the raised areas and lowered areas of the embossed textile fabric layer extend to a depth that is greater than the original thickness of the textile fabric layer. The surface pressure created by the forced air from above or the vacuum underneath or the forced air from above and the vacuum underneath forces or draws the liquid-blocking polymeric layer into contact with the fibrous surface continuously and envelops the whole fibrous surface including the finer surface variations 1008 formed by fibers, filaments or yarns.

In one embodiment, a liquid-blocking polymeric layer is attached to a textile fabric layer pre-embossed with the three-dimensional pattern using a heated tool equipped with surface projections followed by reheating and air or vacuum treatment as illustrated, for example, in FIG. 7. In one embodiment as illustrated in FIG. 8, the textile fabric layer is embossed, and the liquid-blocking polymeric film is attached to the textile fabric layer simultaneously as the textile fabric layer is laminated to a backing layer but prior to the application of surface heat and forced air on top with or without vacuum applied underneath to achieve finer conformability into the contours of the surface. In one embodiment, lamination of the textile fabric layer to the backing layer is performed first with a relatively flat heated tool. Then the combined fabric layer and backing layer, either with or without the liquid-blocking polymeric layer, is embossed with a coarser and deeper three-dimensional pattern. The resulting contoured textile fabric layer and backing layer and attached liquid-blocking polymeric layer is subjected to heat and vacuum to draw the thermoplastic liquid-blocking polymeric layer into the interstices and gaps on the fibrous surface of the textile fabric layer. In one embodiment, the textile fabric layer is laminated to a conformable backing layer using a three-dimensional heated tool to form deeper and coarser face contours that may approach, equal or exceed the original thickness of the textile fabric layer.

In one embodiment, the depth to which a heated liquid-blocking polymeric layer proceeds partly or totally into the interstices or gaps among the surface fibers is controlled by adjusting the melt index of the liquid-blocking polymeric layer or film. In one embodiment the thickness of the liquid-blocking polymeric layer or film is controlled to be sufficiently high to remain as a contiguous liquid-blocking layer but sufficiently low to conform and to allow the contours of face yarns or face fibers or filaments to show on the surface. In one embodiment, the degree of propagation into the textile fabric layer is further controlled through the selective application of vacuum and compressed or forced hot air onto the top fibrous surface of the textile fabric layer.

In one embodiment, the liquid-blocking polymeric layer or film attached to the three-dimensional surface is forced with blown, heated air deeper into the interstices and gaps among the fibers, filaments or yarns present at the fibrous surface to create a more fibrous appearance in the surface of the resulting liquid blocking textile fabric. In one embodiment, the fibrous surface or the entire laminated layers of the textile fabric is preheated prior to the application of forced air. In one embodiment, a liquid-blocking polymeric layer is embossed into the fibrous surface or drawn with vacuum into the fibrous surface and is re-heated and drawn further and deeper into the finer spaces of the surface texture, the surface contour or the surface texture and the surface contour, including spaces or gaps among yarns or fibers or filaments on the fibrous surface. In one embodiment, additional hot air is applied over the liquid-blocking textile fabric. In one embodiment, higher levels of vacuum are applied to the back of the textile fabric layer. In one embodiment, the textile fabric or floorcovering is treated with repellent solutions before or after the application of the liquid-blocking polymeric layer.

Exemplary embodiments are also directed to a method for creating a liquid-blocking three-dimensionally textured textile fabric with a highly durable and fibrous textile surface with non-fraying cut edges. The propagation of liquid-blocking polymeric into the surface interstices also automatically secures the cut edges of the textile fabric against fraying at cut edges. In one embodiment, additional surface heat and compressed air are applied to cut tiles including the edges.

In one embodiment, a textile fabric layer is selected or created. The textile fabric layer is created using yarns, filaments or fibers such as staple fibers. In one embodiment, creating the textile fabric layer includes forming a surface texture in the fibrous surface. The surface texture containing the fibrous elements, i.e., the yarns, filaments or fibers, and gaps among the yarns, filaments or fibers. The fibrous elements have a fibrous element melting point. In one embodiment, the textile fabric layer is a porous textile fabric layer.

In one embodiment, a surface contour is created in the fibrous surface of the textile fabric layer. The surface contour includes a plurality of elevated areas and a plurality of depressed areas.

At least one liquid-blocking polymeric layer is placed on the fibrous surface. In one embodiment, the liquid-blocking polymer layer includes high-melting granules, e.g., particles or powder, non-melting granules or high-melting granules and non-melting granules that enhance at least one of aesthetics and physical properties of the fibrous surface. In one embodiment, high-melting or non-melting granules are selected to produce a desired color or to create visual effects in the fibrous surface. In one embodiment, high-melting or non-melting granules are selected that impart antimicrobial resistance, fire resistance, or friction resistance in the textile fabric layer. In one embodiment, the liquid-blocking polymeric layer is a color-printed film. The liquid-blocking polymeric layer has a liquid-blocking polymeric layer melting point, which is lower than the fibrous element melting point.

In one embodiment, at least one separate adhesive sublayer is placed between the fibrous surface and the liquid-blocking polymeric layer. Suitable adhesive sublayers include, but are not limited to, a film, fabric, molten and extruded polymer, a polymer coated onto the fabric surface, or a layer of low-melting polymeric granules. the adhesive sublayer comprising an adhesive sublayer melting point, the adhesive sublayer melting point lower than the liquid-blocking polymeric layer melting point. In one embodiment, the adhesive sublayer is an extruded polymer, a coated polymer, or a sifted granule. In one embodiment, the liquid-blocking polymer layer is co-extruded with the adhesive sublayer onto the fibrous surface.

In addition to the surface texture and the surface contour, in one embodiment, a three-dimensional pattern containing a plurality of raised areas and a plurality of lowered areas is formed or embossed into one or more of the textile fabric layer, the liquid-blocking polymeric layer and the adhesive sublayer. When formed into a composite containing the textile fabric layer and the liquid-blocking layer or both the liquid-blocking layer and the adhesive layer, the liquid-blocking polymeric layer and adhesive layer conform continuously to the fibrous surface through the raised areas and lowered areas to maintain the three-dimensional pattern.

Heat is applied to the liquid-blocking polymeric layer, and vacuum is applied to a back of the fabric layer opposite the fibrous surface. This softens the liquid-blocking layer and any adhesive layer to pull heated and softened liquid-blocking polymeric layer and softened adhesive layer at least partially into the fabric layer, which attaches the liquid-blocking polymeric layer to the fibrous surface and conforms the liquid-blocking polymeric layer continuously to the fibrous surface through the elevated areas and depressed areas to maintain the surface contour. Suitable methods for applying heat include radiating heat onto the liquid-blocking polymeric layer. In one embodiment, heat and vacuum are used to pull heated and softened liquid-blocking polymeric layer and the adhesive sublayer into the gaps and to conform the liquid-blocking polymeric layer and adhesive sublayer continuously to the surface texture. In one embodiment, air, e.g., forced air or pressurized air, is directed onto the liquid-blocking polymeric layer to conform the liquid-blocking polymeric layer continuously to the fibrous surface through the elevated areas and depressed areas to maintain the surface contour. In one embodiment, heated air is directed unto the fibrous surface.

Depending upon the structure of the top surface of the fabric, the nature of the surface fibers or yarns, and the characteristics and composition of the overlaid liquid-blocking polymeric layer, additional advantages and improvements in different embodiments are achieved in the resulting textile fabric. These advantages and improvements include, but are not limited to, stabilization of the elevated areas versus abrasion, wear, or deformation, and controlling the frictional properties and the frictional characteristics of the textured surface without excessive hardening and without eliminating the fibrous look of the top surface.

The foregoing written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A liquid-blocking textile fabric comprising:
a textile fabric layer comprising a fibrous surface having a surface contour comprising a plurality of elevated areas and a plurality of depressed areas;
a liquid-blocking polymeric layer attached on top of the fibrous surface and conforming continuously to a top of the fibrous surface through the elevated areas and depressed areas to maintain the surface contour; and
a separate adhesive sublayer disposed between the fibrous surface and the liquid-blocking polymeric layer, the adhesive sublayer and liquid-blocking polymeric layer conforming continuously to the fibrous surface through the elevated areas and depressed areas to maintain the surface contour, wherein
the fibrous surface further comprises a surface texture containing a plurality of gaps,
the liquid-blocking polymer layer conforms to the surface texture and extends into the gaps,
the surface texture is formed with loops of woven yarns, knit yarns, stitched yarns, or tufted yarns, and
the gaps comprise gaps among
the loops of woven yarns, knit yarns, stitched yarns, or tufted yarns, or yarns, filaments, or fibers in the fibrous surface.

2. The liquid-blocking textile fabric of claim 1, wherein the fibrous surface with the attached liquid-blocking polymeric layer comprise a hydrostatic resistance of at least 5 psi.

3. The liquid-blocking textile fabric of claim 1, wherein the fibrous surface with the attached liquid-blocking polymeric layer comprise a hydrostatic resistance of at least 10 psi.

4. The liquid-blocking textile fabric of claim 1, wherein the fibrous surface with the attached liquid-blocking polymeric layer comprise a hydrostatic resistance of at least 15 psi.

5. The liquid-blocking textile fabric of claim 1, wherein:
the adhesive sublayer comprises an adhesive sublayer melting temperature;
the textile fabric layer comprises a fabric layer melting temperature;
the liquid-blocking polymer layer comprises a liquid-blocking polymer layer melting temperature; and
the adhesive layer melting temperature is less than the fabric layer melting temperature and the liquid-blocking polymer layer melting temperature.

6. The liquid-blocking textile fabric of claim 1, wherein the adhesive sublayer comprises a low-melting polymeric layer attached to one of the surface of the textile fabric layer and the liquid-blocking polymer layer before attaching the liquid-blocking polymer layer to the surface of the fabric layer.

7. The liquid-blocking textile fabric of claim 1, wherein the adhesive sublayer comprises a coated adhesive sublayer or an extruded adhesive sublayer.

8. The liquid-blocking textile fabric of claim 1, wherein the adhesive sublayer comprises low-melting granules deposited onto one of the fibrous surface and the liquid-blocking polymer layer before attaching the liquid-blocking polymer layer to the fibrous surface.

9. The liquid-blocking textile fabric of claim 1, wherein:
the textile fabric layer comprises a nonwoven layer comprising filaments or staple fibers; and
the surface contour comprises an embossed three-dimensional surface contour.

10. The liquid-blocking textile fabric of claim 9, wherein:
the nonwoven layer comprises a needle-punched felt; and
the fibrous surface comprises the surface texture, which is formed with needles or cup needles.

11. The liquid-blocking textile fabric of claim 1, further comprising a backing layer attached to a back of the textile fabric layer opposite the fibrous surface.

12. The liquid-blocking textile fabric of claim 1, wherein the liquid-blocking polymer layer comprises functional components.

13. The liquid-blocking textile fabric of claim 12, wherein the functional components affect at least one of coloring, abrasion resistance, conductivity, surface friction, and decorative properties in the textile fabric layer.

14. A method for forming a liquid-blocking textile fabric, the method comprising:
forming a surface contour in a fibrous surface of a textile fabric layer, the surface contour comprising a plurality of elevated areas and a plurality of depressed areas;
placing a liquid-blocking polymeric layer on top of the fibrous surface; and
applying heat to the liquid-blocking polymeric layer and vacuum to a back of the fabric layer opposite the fibrous surface to pull heated and softened liquid-blocking polymeric layer at least partially into the fabric layer, to attach the liquid-blocking polymeric layer to the surface and to conform a top of the liquid-blocking polymeric layer continuously to the fibrous surface through the elevated areas and depressed areas to maintain the surface contour,
the method further comprises forming a surface texture in the fibrous surface with loops of woven yarns, knit yarns, stitched yarns, or tufted yarns, wherein the surface texture of the fibrous surface contains a plurality of gaps among the loops of woven yarns, knit yarns, stitched yarns, or tufted yarns, or yarns, filaments, or fibers in the fibrous surface; and applying heat and vacuum further comprises applying heat and vacuum to pull heated and softened liquid-blocking polymeric layer into the gaps and to conform the liquid-blocking polymeric layer continuously to the surface texture, and
the method further comprises
placing a separate adhesive sublayer between the fibrous surface and the liquid-blocking polymeric layer; and
applying heat and vacuum further comprises applying heat and vacuum to pull heated and softened liquid-blocking polymeric layer and adhesive sublayer at least partially into the textile fabric layer, to attach the liquid-blocking polymeric layer and adhesive sublayer to the fibrous surface and to conform the liquid-blocking polymeric layer and adhesive sublayer continuously to the fibrous surface through the elevated areas and depressed areas to maintain the surface contour.

15. The method of claim 14, wherein the textile fabric layer comprises a porous textile fabric layer.

16. The method of claim 14, wherein applying heat comprises radiating heat onto the liquid-blocking polymeric layer.

17. The method of claim 14, further comprising directing air onto the liquid-blocking polymeric layer to conform the liquid-blocking polymeric layer continuously to the fibrous surface through the elevated areas and depressed areas to maintain the surface contour.

18. The method of claim 17, wherein directing air comprising directing heated air.

19. The method of claim 14, wherein the adhesive sublayer comprises a film, fabric, molten and extruded polymer, a polymer coated onto the fabric surface, or a layer of low-melting polymeric granules.

20. The method of claim 14, wherein the liquid-blocking polymer layer comprises high-melting granules, non-melting granules or high-melting granules and non-melting granules that enhance at least one of aesthetics and physical properties of the fibrous surface.

21. The method of claim 20, wherein the method further comprises selecting high-melting or non-melting granules to produce a desired color or to create visual effects in the fibrous surface.

22. The method of claim 20, wherein the method further comprises selecting high-melting or non-melting granules to impart antimicrobial resistance, fire resistance, or friction resistance in the textile fabric layer.

23. The method of claim 14, wherein the liquid-blocking polymeric layer comprises a color-printed film.

* * * * *